United States Patent
Kaganoi et al.

(10) Patent No.: US 8,437,349 B2
(45) Date of Patent: May 7, 2013

(54) MULTICAST SNOOPING ON LAYER 2 VIRTUAL PRIVATE NETWORK

(75) Inventors: Teruo Kaganoi, Funabashi (JP); Naoya Kumita, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 459 days.

(21) Appl. No.: 12/628,455

(22) Filed: Dec. 1, 2009

(65) Prior Publication Data

US 2010/0246580 A1 Sep. 30, 2010

(30) Foreign Application Priority Data

Mar. 26, 2009 (JP) .................................. 2009-76272

(51) Int. Cl.
*H04L 12/56* (2006.01)

(52) U.S. Cl.
USPC ........ 370/390; 370/395.5; 370/401; 370/432; 370/469

(58) Field of Classification Search .................. None
See application file for complete search history.

(56) References Cited

U.S. PATENT DOCUMENTS 7,529,243 B2 * 5/2009 Sodder et al. ................. 370/392
7,751,399 B2 * 7/2010 Martini et al. ................ 370/392
7,801,125 B2 * 9/2010 Kreeger et al. ............... 370/389
8,165,038 B2 * 4/2012 Shaw et al. ................... 370/254

FOREIGN PATENT DOCUMENTS

JP 2008-60831 A 3/2008

* cited by examiner

*Primary Examiner* — Hassan Phillips
*Assistant Examiner* — Mark A Mais
(74) *Attorney, Agent, or Firm* — Mattingly & Malur, PC

(57) ABSTRACT

A network system includes: a core switch; and an edge switch. The edge switch includes: a join message identification unit; and a marking unit. The join message identification unit identifies a join message from among MAC frames from the user network. The marking unit marks mark information to a header of a MAC-in-MAC frame in which the identified join message is encapsulated. The core switch includes: a plurality of input/output ports; a mark identification unit; and a port setup unit. The mark identification unit identifies a MAC-in-MAC frame in which a header is marked with the mark information. The port setup unit associates a multicast group of a join message which is encapsulated in the identified MAC-in-MAC frame, with an input/output port to which the identified MAC-in-MAC frame is input.

10 Claims, 13 Drawing Sheets

Fig.4

| REGISTRATION NUMBER 2421 | VLAN IDENTIFIER 2422 | DESTINATION MAC ADDRESS 2424 | OUTPUT PORT NUMBER 2426 | CORE NETWORK DESTINATION MAC ADDRESS 2428 | LEARNING SOURCE 2429 |
|---|---|---|---|---|---|
| 1 | 20 | 00:00:4c:00:12:34 | 1 | fe:00:00:20:00:03 | CORE NETWORK |
| 2 | 100 | 00:0a:e4:00:12:34 | 1 | fe:00:01:00:00:03 | CORE NETWORK |
| 3 | 20 | 00:00:4c:51:22:a5 | 1 | fe:00:00:20:00:03 | CORE NETWORK |
| ... | ... | ... | ... | ... | ... |
| 500 | 20 | 01:00:5e:00:12:34 | 1 | ff:00:00:20:12:34 | SNOOPING |
| 501 | 20 | 00:00:4c:a1:54:21 | 3 | — | USER NETWORK |
| ... | ... | ... | ... | ... | ... |

| REGISTRATION NUMBER | VLAN IDENTIFIER | DESTINATION MAC ADDRESS | OUTPUT PORT NUMBER | CORE NETWORK DESTINATION MAC ADDRESS | LEARNING SOURCE |
|---|---|---|---|---|---|
| 1 | 20 | 00:00:4c:00:12:34 | 2 | - | USER NETWORK |
| 2 | 100 | 00:0a:e4:00:12:34 | 3 | - | USER NETWORK |
| 3 | 20 | 00:00:4c:51:22:a5 | 2 | - | USER NETWORK |
| ... | ... | ... | ... | ... | ... |
| 500 | 20 | 01:00:5e:00:12:34 | 2 | - | SNOOPING |
| 501 | 20 | 00:00:4c:a1:54:21 | 1 | fe:00:00:20:00:01 | CORE NETWORK |
| ... | ... | ... | ... | ... | ... |

Fig.7

| REGISTRATION NUMBER | VLAN IDENTIFIER | CORE NETWORK DESTINATION MAC ADDRESS | OUTPUT PORT NUMBER | LEARNING SOURCE |
|---|---|---|---|---|
| 1 | 20 | fe:00:00:20:00:01 | 1 | PORT 1 |
| 2 | 100 | fe:00:01:00:00:01 | 2 | PORT 2 |
| 3 | 20 | fe:00:00:20:00:02 | 2 | PORT 2 |
| ... | ... | ... | ... | ... |
| 500 | 20 | ff:00:00:20:12:34 | 2,3 | SNOOPING |
| 501 | 20 | fe:00:00:20:00:04 | 4 | PORT 4 |
| ... | ... | ... | ... | ... |

MULTICAST SNOOPING ON LAYER 2 VIRTUAL PRIVATE NETWORK

CROSS-REFERENCE TO RELATED APPLICATIONS

The present application claims the priority based on Japanese Patent Application No. 2009-76272 filed on Mar. 26, 2009, the disclosure of which is hereby incorporated by reference in its entirety.

BACKGROUND

The present invention relates to a network system for forming an L2VPN (Layer 2 Virtual Private Network) which is designed to relay layer 2 frames among a plurality of points in a user network.

A network system for forming an L2VPN based on the IEEE 802.1ah protocol (Institute of Electrical and Electronics Engineers 802.1ah, Provider Backbone Bridge (PBB)) has been proposed. In such a network system, data forwarding is executed using a MAC-in-MAC frame on a core network (also known as a backbone network) which performs as a trunk communication network. The MAC-in-MAC frame includes a MAC (Media Access Control) frame, which is a layer 2 frame, encapsulated within another MAC frame.

SUMMARY

A problem encountered in the network system is that, in forwarding a join message (e.g., an IGMP (Internet Group Management Protocol) join message requesting to join a multicast group) to the L2VPN, a core switch, which is a layer 2 switch in the core network, is not able through snooping to recognize the join message encapsulated in a MAC-in-MAC frame. Thus, in forwarding multicast packets distributed based on the join message to the L2VPN, all of the core switches in the core network experience flooding with the multicast packets, and the flooding results in reduction of a communication rate in the L2VPN.

In view of this problem, an advantage of some aspects of the invention is to provide technology for avoiding flooding with multicast packets in a network in which data forwarding is executed using the MAC-in-MAC frame.

An advantage of some aspects of the invention is intended to address this issue at least in part, and can be reduced to practice as described below.

(1st Aspect) A network system according to a 1st aspect forms an L2VPN for relaying a MAC frame being forwarded among a plurality of points in a user network, and includes: a core switch; and an edge switch. The core switch relays a MAC-in-MAC frame in which the MAC frame is encapsulated. The edge switch relays the MAC frame between the user network and the core switch with conversion between the MAC frame and the MAC-in-MAC frame. The edge switch includes: a join message identification unit; and a marking unit. The join message identification unit identifies, from among MAC frames from the user network, a join message being forwarded to a router from a host to be joining a multicast group. The marking unit marks a header of a MAC-in-MAC frame in which the identified join message is encapsulated, with mark information indicating the identified join message. The core switch includes: a plurality of input/output ports; a mark identification unit; and a port setup unit. The plurality of input/output ports performs input and output of a layer 2 frame. The mark identification unit identifies, from among MAC-in-MAC frames which are input through the plurality of input/output ports, a MAC-in-MAC frame to whose header the mark information is marked. The port setup unit associates a multicast group of a join message which is encapsulated in the identified MAC-in-MAC frame, with an input/output port to which the identified MAC-in-MAC frame is input.

According to the network system in the 1st aspect, the input/output port of the core switch can be associated with the multicast group through snooping of the mark information marked to the header of the MAC-in-MAC frame by the core switch. Thus, it is possible to identify the multicast group from the MAC-in-MAC frame in which the multicast frame is encapsulated, and to then output the MAC-in-MAC frame from the input/output port which is associated with the multicast group. As a result, it can avoid flooding with MAC-in-MAC frames in which multicast frames are encapsulated, thereby limiting any reduction of communication rate caused by multicast communications.

(2nd Aspect) In the network system according to the 1st aspect, the edge switch may further include: a multicast frame identification unit; and a multicast group labeling unit, and the core switch may further include: a multicast group identification unit; and a port assignment unit. The multicast frame identification unit identifies, from among MAC frames from the user network, a multicast frame being forwarded from the router. The multicast group labeling unit labels a header of a MAC-in-MAC frame in which the identified multicast frame is encapsulated, with multicast group information showing a multicast group of the identified multicast frame. The multicast group identification unit identifies, from among MAC-in-MAC frames which are input through the plurality of input/output ports, a MAC-in-MAC frame to whose header the multicast group information is labeled. The port assignment unit assigns, as a forwarding output port for outputting the MAC-in-MAC frame identified by the multicast group identification unit, an input/output port which is associated by the port setup unit with a multicast group shown by the multicast group information of the MAC-in-MAC frame identified by the multicast group identification unit.

According to the network system in the 2nd aspect, through snooping, by the core switch, of multicast group information labeled to the header of the MAC-in-MAC frame, it is a simple matter to identify a multicast group representing a destination of the MAC-in-MAC frame in which multicast frames are encapsulated.

(3rd Aspect) In the network system according to the 1st aspect, the marking unit of the edge switch may mark with the mark information to at least one of following storage fields in the header of the MAC-in-MAC frame in which the identified join message is encapsulated:

(a1) a storage field for storing information showing priority of processing the MAC-in-MAC frame;

(a2) a storage field for storing information showing a sender of the MAC-in-MAC frame;

(a3) a storage field for storing information showing a destination of the MAC-in-MAC frame; and (a4) a storage field for storing information showing a protocol and/or size regarding data being transported by the MAC-in-MAC frame.

According to the network system in the 3rd aspect, the mark information can be marked to the header of the MAC-in-MAC frame to enable snooping by the core switch, without causing inconvenience to data forwarding of MAC-in-MAC frames.

(4th Aspect) In the network system according to the 2nd aspect, the multicast group labeling unit of the edge switch may label with the multicast group information to at least one of following storage fields in the header of the MAC-in-MAC frame in which the identified multicast frame is encapsulated:

(b1) a storage field for storing information showing a destination of the MAC-in-MAC frame; and (b2) a storage field for storing information showing a user network for which a MAC frame is encapsulated in the MAC-in-MAC frame.

According to the network system in the 4th aspect, the multicast group information can be labeled to the header of the MAC-in-MAC frame to enable snooping by the core switch, without causing inconvenience to data forwarding of MAC-in-MAC frames.

(5th Aspect) A core switch according to a 5th aspect relays a MAC-in-MAC frame in which a MAC frame is encapsulated, and includes: a plurality of input/output ports; a mark identification unit; and a port setup unit. The plurality of input/output ports performs input and output of a layer 2 frame. The mark identification unit identifies, from among MAC-in-MAC frames which are input through the plurality of input/output ports, a MAC-in-MAC frame to whose header a mark information is marked, wherein the mark information indicates a join message being forwarded to a router from a host to be joining a multicast group. The port setup unit associates a multicast group of a join message which is encapsulated in the identified MAC-in-MAC frame, with an input/output port to which the identified MAC-in-MAC frame is input.

According to the core switch in the 5th aspect, the input/output port can be associated with the multicast group through snooping of the mark information marked to the header of the MAC-in-MAC frame. Thus, it is possible to identify the multicast group from the MAC-in-MAC frame in which the multicast frame is encapsulated, and to then output the MAC-in-MAC frame from the input/output port which is associated with the multicast group. As a result, it can avoid flooding with MAC-in-MAC frames in which multicast frames are encapsulated, thereby limiting any reduction of communication rate caused by multicast communications.

(6th Aspect) In the core switch according to the 5th aspect, the core switch may further include: a multicast group identification unit; and a port assignment unit. The multicast group identification unit identifies, from among MAC-in-MAC frames which are input through the plurality of input/output ports, a MAC-in-MAC frame to whose header a multicast group information is labeled, wherein the multicast group information shows a multicast group of a multicast frame being forwarded from the router. The port assignment unit assigns, as a forwarding output port for outputting the MAC-in-MAC frame identified by the multicast group identification unit, an input/output port which is associated by the port setup unit with a multicast group shown by the multicast group information of the MAC-in-MAC frame identified by the multicast group identification unit. According to the core switch in the 6th aspect, through snooping of multicast group information labeled to the header of the MAC-in-MAC frame, it is a simple matter to identify a multicast group representing a destination of the MAC-in-MAC frame in which multicast frames are encapsulated.

(7th Aspect) An edge switch according to a 7th aspect relays a MAC frame between a user network and a core switch with conversion between the MAC frame and a MAC-in-MAC frame, and includes: a join message identification unit; and a marking unit. The join message identification unit identifies, from among MAC frames from the user network, a join message being forwarded to a router from a host to be joining a multicast group. The marking unit marks a header of a MAC-in-MAC frame in which the identified join message is encapsulated, with mark information indicating the identified join message. According to an edge switch in the 7th aspect, the edge switch can generate the MAC-in-MAC frame from which the core switch can recognize through snooping that the join message is encapsulated in the MAC-in-MAC frame.

(8th Aspect) In the edge switch according to the 7th aspect, the edge switch may further include: a multicast frame identification unit; and a multicast group labeling unit. The multicast frame identification unit identifies, from among MAC frames from the user network, a multicast frame being forwarded from the router. The multicast group labeling unit labels a header of a MAC-in-MAC frame in which the identified multicast frame is encapsulated, with multicast group information showing a multicast group of the identified multicast frame. According to the edge switch in the 8th aspect, the edge switch can generate the MAC-in-MAC frame from which the core switch can recognize, through snooping, a multicast group representing a destination of the MAC-in-MAC frame in which multicast frames are encapsulated.

(9th Aspect) A method according to a 9th aspect is a method for relaying a MAC frame being forwarded among a plurality of points in a user network. The method includes: relaying, by a core switch, a MAC-in-MAC frame in which the MAC frame is encapsulated, wherein the core switch includes a plurality of input/output ports that performs input and output of a layer 2 frame; and relaying, by an edge switch, the MAC frame between the user network and the core switch with conversion between the MAC frame and the MAC-in-MAC frame. The relaying by the edge switch includes: identifying, from among MAC frames from the user network, a join message being forwarded to a router from a host to be joining a multicast group; and marking a header of a MAC-in-MAC frame in which the identified join message is encapsulated, with mark information indicating the identified join message. The relaying by the core switch includes: identifying, from among MAC-in-MAC frames which are input through the plurality of input/output ports, a MAC-in-MAC frame to whose header the mark information is marked; and associating a multicast group of a join message which is encapsulated in the identified MAC-in-MAC frame, with an input/output port to which the identified MAC-in-MAC frame is input.

According to the method in the 9th aspect, the input/output port of the core switch can be associated with the multicast group through snooping of the mark information marked to the header of the MAC-in-MAC frame by the core switch. Thus, it is possible to identify the multicast group from the MAC-in-MAC frame in which the multicast frame is encapsulated, and to then output the MAC-in-MAC frame from the input/output port which is associated with the multicast group. As a result, it can avoid flooding with MAC-in-MAC frames in which multicast frames are encapsulated, thereby limiting any reduction of communication rate caused by multicast communications.

(10th Aspect) In the method according to the 10th aspect, the relaying by the edge switch may further include: identifying, from among MAC frames from the user network, a multicast frame being forwarded from the router; and labeling a header of a MAC-in-MAC frame in which the identified multicast frame is encapsulated, with multicast group information showing a multicast group of the identified multicast frame. And the relaying by the core switch may further include: identifying, from among MAC-in-MAC frames which are input through the plurality of input/output ports, a MAC-in-MAC frame to whose header the multicast group information is labeled; and assigning, as a forwarding output port for outputting the MAC-in-MAC frame identified by the multicast group information, an input/output port which is associated by the port setup unit with a multicast group shown by the multicast group information of the MAC-in-MAC frame identified by the multicast group information. According to the method in the 10th aspect, through snooping, by the core switch, of multicast group information labeled to the header of the MAC-in-MAC frame, it is a simple matter to identify a multicast group representing a destination of the MAC-in-MAC frame in which multicast frames are encapsulated.

An aspect of the invention is not limited to a network system, a core switch, an edge switch, and method for relaying and may be applied to other aspects including a program for causing a computer to execute a function of a core switch, a program for causing a computer to execute a function of an edge switch, a method for relaying in a core switch, and a method for relaying in an edge switch. The invention should not be construed as limited to the aspects set forth hereinabove, and naturally various aspects of the invention may be enabled without departing from the scope of the invention.

These and other objects, features, aspects, and advantages of the invention will become more apparent from the following detailed description of the preferred embodiments with the accompanying drawings.

BRIEF DESCRIPTION OF THE DRAWINGS

The invention will be described with reference to the accompanying drawings in which:

FIG. 4 is an illustration showing an example of a forwarding destination database in an edge switch;

FIG. 5 is an illustration showing an example of a forwarding destination database in an edge switch;

FIG. 7 is an illustration showing an example of a forwarding destination database in a core switch;

DESCRIPTION OF THE PREFERRED EMBODIMENTS

A better understanding of the design and advantages of the invention set forth above will be provided through the following description of the invention embodied in a computer system.

A. Embodiment 1

A1. Computer Network Configuration

Figure 1:
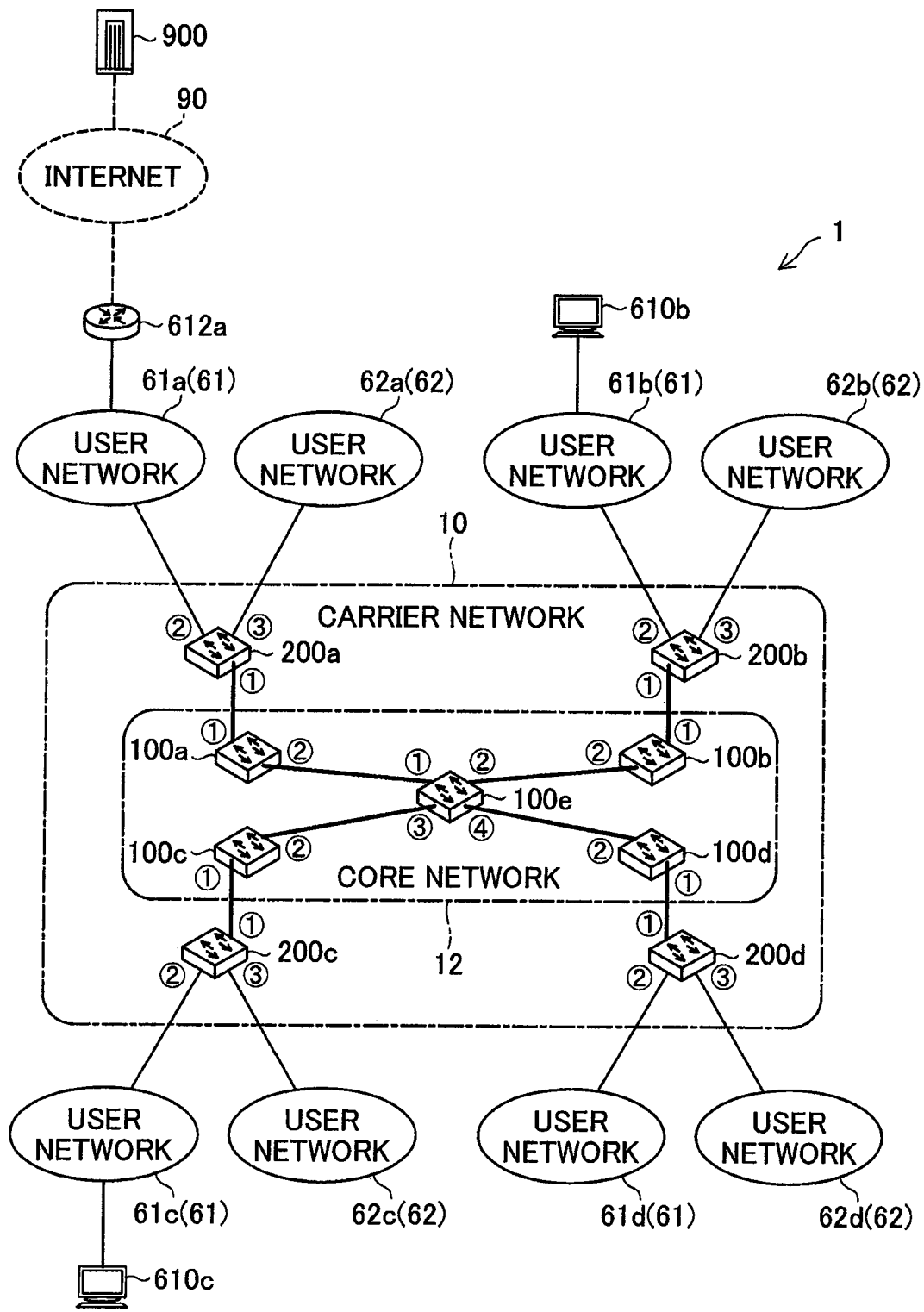
FIG. 1 is an illustration showing a configuration of a computer network.

FIG. 1 is an illustration showing a configuration of a computer network 1. The computer network 1 is a network system that includes a carrier network 10, and user networks 61 and 62.

The user networks 61 and 62 of the computer network 1 are network systems run by customers, for example, an enterprise, an institution or an individual, who subscribe to the communications services of the carrier network 10. The user network 61 includes a number of point networks 61a, 61b, 61c and 61d. Each of point networks 61a, 61b, 61c and 61d is interconnected through the carrier network 10 and cooperates to make up a local area network (hereinafter LAN). Like the user network 61, the user network 62 includes a number of point networks 62a, 62b, 62c and 62d. Each of point networks 62a, 62b, 62c and 62d is interconnected through the carrier network 10 and cooperates to make up a LAN.

The user networks 61 and 62 may make up a simple LAN, or may instead make up a virtual LAN (hereinafter VLAN), which is a virtual network in which virtual network groups are configured independently of actual physical connections in the LAN. While FIG. 1 shows two such user networks, each of which is shown to include four point networks, the numbers of user networks and point networks are not limited to those shown in FIG. 1, and may be increased or decreased appropriately.

In the user network 61, at least one of the several point networks 61a, 61b, 61c and 61d includes a personal computer 610 and a router 612. The personal computer 610 executes various arithmetic processing. The router 612 interconnects the user network 61 with other networks.

In the description of the present embodiment, the symbol "610" is used to identify generally any personal computer belonging to the user network 61; while in instances where it is necessary to identify a personal computer belonging to a particular point network, a symbol that includes "610" suffixed by the letter appended to the symbol of that point network will be used. For example, a personal computer belonging to the point network 61b will be assigned the symbol "610b", while a personal computer belonging to the point network 61c is assigned the symbol "610c".

Also, in the description of the present embodiment, the symbol "612" is used to identify generally any router belonging to the user network 61; while in instances where it is necessary to identify a router belonging to a particular point network, a symbol that includes "612" suffixed by the letter appended to the symbol of that point network will be used. For example, a router belonging to the point network 61a is assigned the symbol "612a".

In the present embodiment, the point network 61a includes a router 612a. The router 612a interconnects the Internet 90 and the user network 61. In the present embodiment, the Internet 90 is connected with a server computer 900 adapted to transmit a multicast packet. The personal computer 610b of the point network 61b, and the personal computer 610c of the point network 61c are individually able to receive a multicast packet from the server computer 900 through the router 612a of the point network 61a.

The carrier network 10 of the computer network 1 is a network system that is operated by a telecom provider. The carrier network 10 forms an L2VPN (Layer 2 Virtual Private Network) for relaying MAC frames which are forwarded among the several point networks in the user networks 61 and 62. The carrier network 10 includes a core switch 100 and an edge switch 200. The core switch 100 makes up a core network 12 constituting a trunk communication network in which data forwarding is executed using a MAC-in-MAC frame based on IEEE 802.1ah protocol. The edge switch 200 interconnects between the user networks 61 and 62, and the core network 12. The configuration and operation of the core switch 100 and the edge switch 200 will be discussed in detail later.

In the description of the present embodiment, the symbol "100" is used to identify generally any core switch belonging to the carrier network 10, while in instances where it is necessary to individually identify a particular core switch, a symbol that includes "100" suffixed by a letter will be used. For example, in the example illustrated in FIG. 1, five core switches 100 are shown, and where these core switches 100 are identified on an individual basis, the symbols "100a", "100b", "100c", "100d", and "100e" are used.

In the description of the present embodiment, the symbol "200" is used to identify generally any edge switch belonging to the carrier network 10, while in instances where it is necessary to individually identify a particular edge switch, a symbol that includes "200" suffixed by a letter will be used. For example, in the example illustrated in FIG. 1, four edge switches 200 are shown, and where these edge switches 200 are identified on an individual basis, the symbols "200a", "200b", "200c", and "200d" are used.

In the example shown in FIG. 1, the core switch 100e interconnects between the individual core switches 100a, 100b, 100c, and 100d. In the example shown in FIG. 1, the edge switch 200a interconnects between the core switch 100a, and the point networks 61a and 62a. The edge switch 200b interconnects between the core switch 100b, and the point networks 61b and 62b. The edge switch 200c interconnects between the core switch 100c, and the point networks 61c and 62c. The edge switch 200d interconnects between the core switch 100d, and the point networks 61d, 62d. While FIG. 1 shows five core switches 100 and four edge switches 200, the numbers of core switches 100 and edge switches 200 are not limited to those shown in FIG. 1, and may be increased or decreased in number appropriately.

Figure 2:
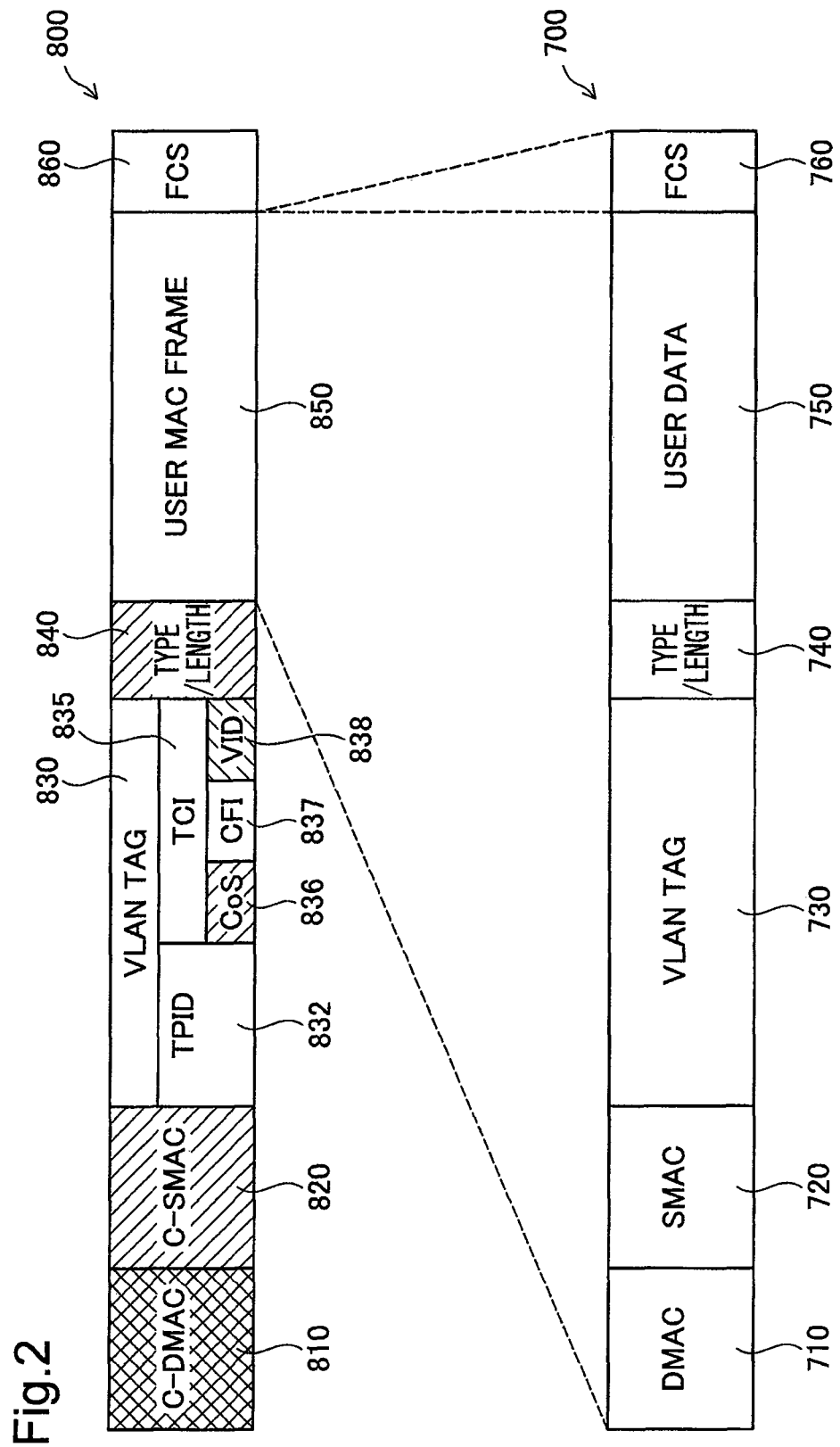
FIG. 2 is an illustration showing in model form a frame structure of a MAC frame and a frame structure of a MAC-in-MAC frame.

FIG. 2 is an illustration showing in model form a frame structure 700 of a MAC frame and a frame structure 800 of a MAC-in-MAC frame. The frame structure 800 of the MAC-in-MAC frame is shown at the top in FIG. 2, while the frame structure 700 of the MAC frame is shown at the bottom in FIG. 2.

The frame structure 700 of the MAC frame includes, in order from the beginning, storage fields 710, 720, 730, 740, 750, and 760. The storage fields 710, 720, 730, and 740 constitute a header of the MAC frame.

The storage field 710 of the frame structure 700 is a DMAC (Destination MAC) field for storing a MAC address showing a destination of the MAC frame. The storage field 720 of the frame structure 700 is an SMAC (Source MAC) field for storing a MAC address showing a sender of the MAC frame.

The storage field 730 of the frame structure 700 is a VLAN tag field for storing a VLAN tag showing a VLAN configured in the user networks 61 and 62.

The storage field 740 of the frame structure 700 is a Type/Length field for storing an identifier showing a type of higher layer protocol for a packet in the storage field 750, and/or an octet number showing size of data stored in the storage field 750.

The storage field 750 of the frame structure 700 is a user data field for storing data being transported by the MAC frame. An IGMP join message and a multicast packet used in multicast communications are forwarded while stored in the storage field 750 of the frame structure 700.

The storage field 760 of the frame structure 700 is an FCS (Frame Check Sequence) field that stores a CRC (Cyclic Redundancy Check) value used to detect errors in the MAC frame.

The frame structure 800 of the MAC-in-MAC frame includes, in order from the beginning, storage fields 810, 820, 830, 840, 850, and 860. The storage fields 810, 820, 830, and 840 constitute the header of the MAC-in-MAC frame.

The storage field 810 of the frame structure 800 is a C-DMAC (Core-Destination MAC) field for storing a MAC address showing a destination of the MAC-in-MAC frame in the core network 12. The storage field 820 of the frame structure 800 is a C-SMAC (Core-Source MAC) field for storing a MAC address showing a sender of the MAC-in-MAC frame in the core network 12.

The storage field 830 of the frame structure 800 is a VLAN tag field for storing a VLAN tag showing a VLAN configured in the user networks 61 and 62. The storage field 830 includes storage fields 832 and 835. The storage field 832 in the storage field 830 is a TPID (Tag Protocol Identifier) field for storing an identifier for making the VLAN tag enabled or disabled.

The storage field 835 in the storage field 830 is a TCI (Tag Control Information) field for storing control data for controlling a VLAN configured in the user networks 61 and 62. The storage field 835 includes storage fields 836, 837, and 838. The storage field 836 in the storage field 835 is a CoS (Class of Service) field for storing information showing priority in processing for the MAC-in-MAC frame. The storage field 837 in the storage field 835 is a CFI (Canonical Format Indicator) field for storing information showing the format of the MAC address in the MAC-in-MAC frame. The storage field 838 in the storage field 835 is a VID (VLAN Identifier) field for storing an identifier showing a VLAN as a destination of the MAC-in-MAC frame.

The storage field 840 of the frame structure 800 is a Type/Length field for storing an identifier showing a type of higher layer protocol for a packet in the storage field 850, and/or an octet number showing size of data stored in the storage field 850.

The storage field 850 of the frame structure 800 is a User MAC Frame field for storing the MAC frame encapsulated in the MAC-in-MAC frame. The MAC frame stored in the storage field 850 may either include or leave out the storage field 760 of the frame structure 700.

The storage field 860 of the frame structure 800 is an FCS field for storing a CRC value used to detect errors in the MAC-in-MAC frame.

Figure 3:
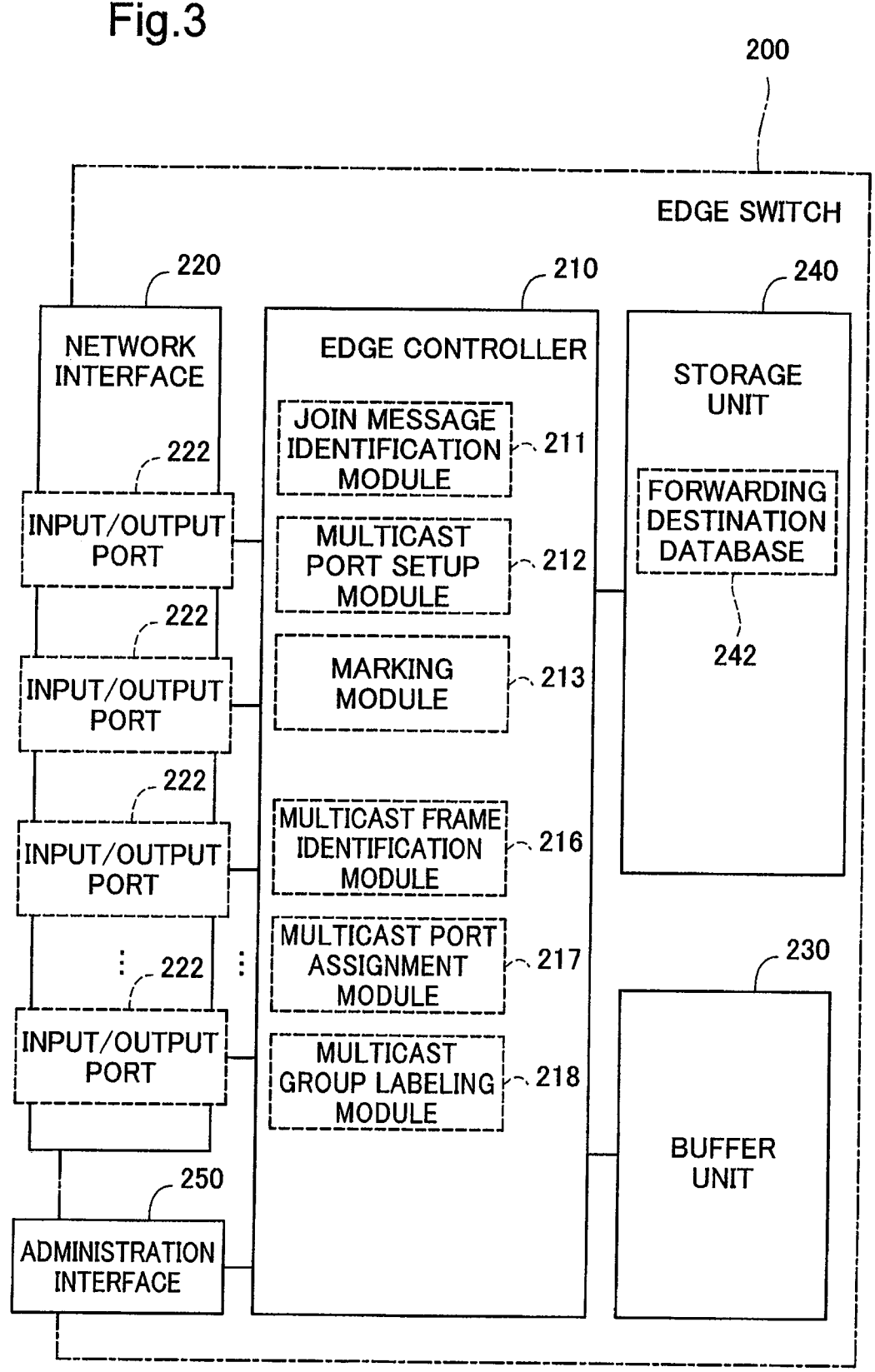
FIG. 3 is an illustration showing in detail a configuration of an edge switch in a carrier network.

FIG. 3 is an illustration showing in detail a configuration of the edge switch 200 in the carrier network 10. The edge switch 200 is a connecting device that relays between the user networks 61, 62 and the core switch 100 with conversion between a MAC frame and a MAC-in-MAC frame. The edge switch 200 includes an edge controller 210, a network interface 220, a buffer unit 230, a storage unit 240, and an administration interface 250.

The network interface 220 of the edge switch 200 includes a plurality of input/output ports 222. The plurality of input/output ports 222 are physical connector terminals providing electrical connections to the core switch 100 and to the user networks 61 and 62. Each of the plurality of input/output ports 222 is adapted to receive input of a layer 2 frame and to output a layer 2 frame based on an instruction from the edge controller 210, and these layer 2 frames include a MAC frame or a MAC-in-MAC frame.

The buffer unit 230 of the edge switch 200 is a storage device for temporarily storing a layer 2 frame being processed by the edge controller 210. The administration interface 250 of the edge switch 200 performs exchange of information with a administrator of the carrier network 10. In the present embodiment, the administration interface 250 includes electronic devices such as a control panel, memory card slot, and input/output connecting terminals of various kinds.

The storage unit 240 of the edge switch 200 is a storage device for storing data of various types being processed by the edge controller 210, and storing a forwarding destination database 242 by way of one such type of data. The forwarding destination database 242 is a database for registering information for assigning a forwarding output port for outputting of a layer 2 frame, from among the plurality of input/output ports 222 in the network interface 220. In the present embodiment, the forwarding destination database 242 is provided through a learning function by the edge controller 210 based on layer 2 frames received through the input/output ports 222. However, in an alternative embodiment, the forwarding destination database 242 may be provided at least in part based on information received through the administration interface 250.

In the description of the present embodiment, the symbol "242" is used to identify generally any forwarding destination database in an edge switch, while in instances where it is necessary to individually identify the forwarding destination database in a particular edge switch, a symbol including a letter suffixed to "242" will be used. For example, the symbol "242a" is used for the forwarding destination database in the edge switch 200a, and the symbol "242c" is used for the forwarding destination database in the edge switch 200c.

FIG. 4 is an illustration showing an example of a forwarding destination database 242a in an edge switch 200a. FIG. 5 is an illustration showing an example of a forwarding destination database 242c in an edge switch 200c. The forwarding destination database 242 in the edge switch 200 includes storage fields 2421, 2422, 2424, 2426, 2428, and 2429.

The storage field 2421 of the forwarding destination database 242 is a field for storing a registration number for identifying information registered in this forwarding destination database 242. The storage field 2422 of the forwarding destination database 242 is a field for storing a VLAN identifier for identifying a VLAN configured in the user networks 61 and 62. The storage field 2424 of the forwarding destination database 242 is a field for storing a destination MAC address showing a destination of a MAC frame. The storage field 2426 of the forwarding destination database 242 is a field for storing an output port number indicating a forwarding output port by using port numbers assigned to each of the plurality of input/output ports 222. The storage field 2428 of the forwarding destination database 242 is a field for storing a core network destination MAC address showing a destination of a MAC-in-MAC frame. The storage field 2429 of the forwarding destination database 242 is a field for storing a learning source of information recorded in the forwarding destination database 242.

For example, the case of the forwarding destination database 242a shown in FIG. 4, the registration information identified with registration number "1" shows that the information is learned from the core network 12. The registration information identified with the registration number "1" shows that, when a MAC frame received in the edge switch 200a belongs to a VLAN identified with the VLAN identifier "20", and has a destination MAC address "00:00:4c:00:12:34", a destination MAC address of a MAC-in-MAC frame, in which this MAC frame is encapsulated, is set to "fe:00:00:20:00:03", and this MAC-in-MAC frame is sent from an input/output port 222 assigned to the port number "1". In FIG. 1, the circled numbers shown next to the straight lines leading from the edge switches 200 to other nodes correspond to port numbers assigned to input/output ports 222.

In the case of the forwarding destination database 242c shown in FIG. 5, the registration information identified with registration number "1" shows that the information is learned from a user network. The registration information identified with the registration number "1" shows that, when a MAC frame received in the edge switch 200c belongs to a VLAN identified with the VLAN identifier "20", and has a destination MAC address "00:00:4c:00:12:34", this MAC frame is sent from an input/output port 222 assigned to the port number "2".

Returning to the discussion of FIG. 3, the edge controller 210 of the edge switch 200 is electrically connected to the parts of the edge switch 200, and executes various control processes for forwarding a layer 2 frame including a MAC frame or a MAC-in-MAC frame. The edge controller 210 includes a join message identification module 211, a multicast port setup module 212, a marking module 213, a multicast frame identification module 216, a multicast port assignment module 217, and a multicast group labeling module 218.

The join message identification module 211 of the edge controller 210 identifies a join message being forwarded to the router 612 from the personal computer 610 which is a host to be joining a multicast group, from among MAC frames forwarded from the user networks 61 and 62, and from the core switches 100. In the present embodiment, the join message identification module 211 identifies, as the join message, an IGMP join message sent from the personal computer 610 to the router 612.

The multicast port setup module 212 of the edge controller 210 associates a multicast group of the IGMP join message identified by the join message identification module 211, with an input/output port 222 to which this IGMP join message is input. In the present embodiment, the multicast port setup module 212 registers information for associating the multicast group with the input/output port 222 in the forwarding destination database 242.

The marking module 213 of the edge controller 210 marks information indicating that the IGMP join message identified by the join message identification module 211 is encapsulated, to a header of a MAC-in-MAC frame in which this IGMP join message is encapsulated, when this IGMP join message is to be forwarded to the core switch 100.

The multicast frame identification module 216 of the edge controller 210 identifies a multicast frame from among MAC frames forwarded from the user networks 61 and 62, and from the core switch 100. The multicast frame is a MAC frame for transferring a multicast packet sent from the router 612.

The multicast port assignment module 217 of the edge controller 210 assigns an input/output port 222 associated by the multicast port setup module 212 with a multicast group of the multicast frame identified by the multicast frame identification module 216, as a forwarding output port for outputting this multicast frame. In the present embodiment, the multicast port assignment module 217 references the forwarding destination database 242 when assigning the forwarding output port.

The multicast group labeling module 218 of the edge controller 210 labels multicast group information showing a multicast group of the multicast frame identified by the multicast frame identification module 216, to a header of a MAC-in-MAC frame in which this multicast frame is encapsulated, when this multicast frame is to be forwarded to the core switch 100.

In the present embodiment, the functions of the multicast port setup module 212, the marking module 213, the multicast frame identification module 216, the multicast port assignment module 217, and the multicast group labeling module 218 are accomplished by operation of ASICs (Application Specific Integrated Circuits) based on their physical circuit design; however, in an alternative embodiment, these functions could be accomplished at least in part by operation of a CPU (Central Processing Unit) on the basis of a computer program.

Figure 6:
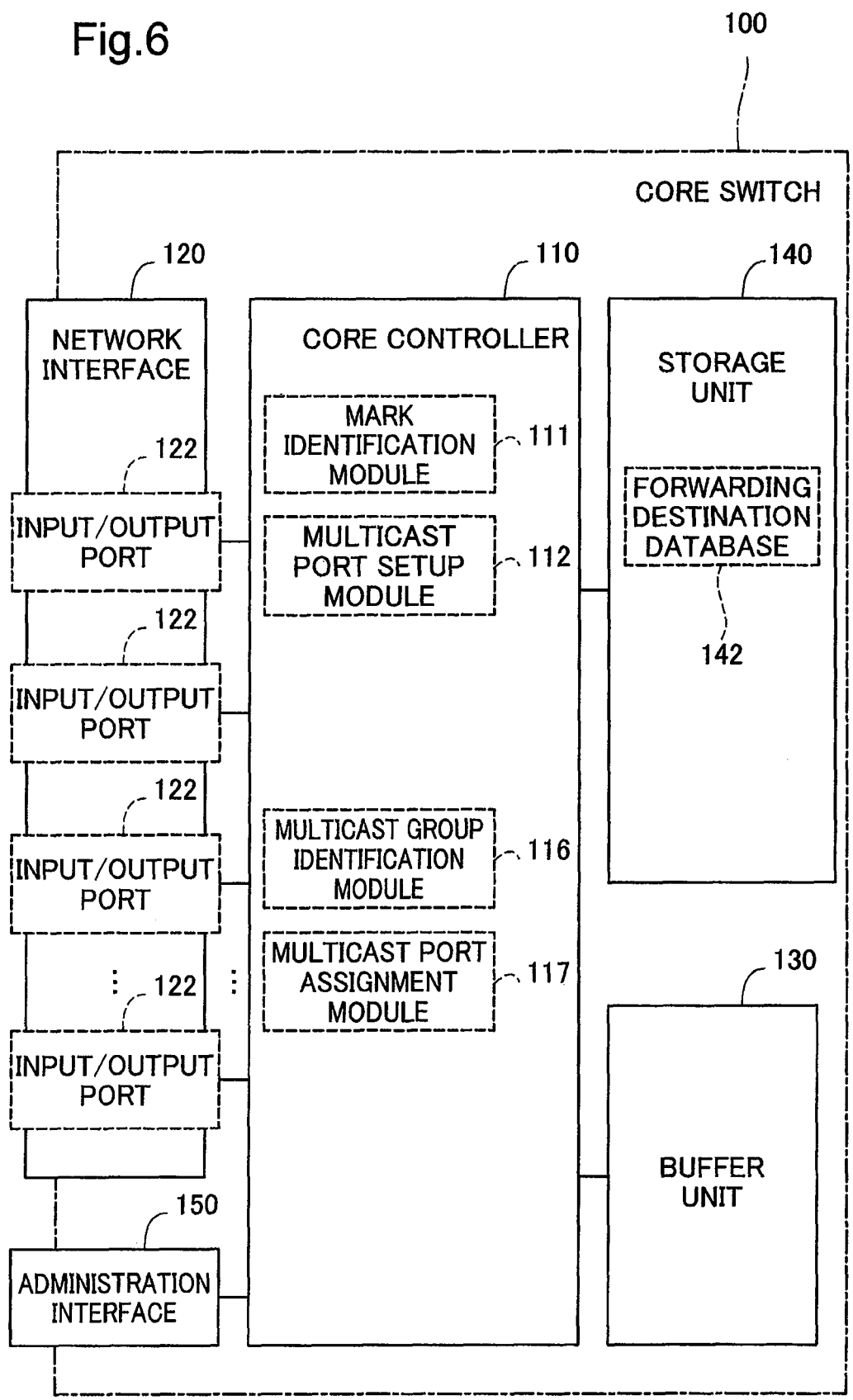
FIG. 6 is an illustration showing in detail a configuration of a core switch in the carrier network.

FIG. 6 is an illustration showing in detail a configuration of the core switch 100 in the carrier network 10. The core switch 100 is a connecting device that relays a MAC-in-MAC frame in which a MAC frame is encapsulated. The core switch 100 includes a core controller 110, a network interface 120, a buffer unit 130, storage unit 140, and an administration interface 150.

The network interface 120 of the core switch 100 includes a plurality of input/output ports 122. The plurality of input/output ports 122 are physical connector terminals providing electrical connection to the edge switch 200 and to other core switches 100. Each of the plurality of input/output ports 122 is adapted to receive input of a MAC-in-MAC frame, and to output a MAC-in-MAC frame based on an instruction from the core controller 110.

The buffer unit 130 of the core switch 100 is a storage device for temporarily storing a MAC-in-MAC frame being processed by the core controller 110. The administration interface 150 of the core switch 100 performs exchange of information with the administrator of the carrier network 10. In the present embodiment, the administration interface 150 includes electronic devices such as a control panel, memory card slot, and input/output connecting terminals of various kinds.

The storage unit 140 of the core switch 100 is a storage device for storing data of various types being processed by the core controller 110, and storing a forwarding destination database 142 by way of one such type of data. The forwarding destination database 142 is a database for registering information for assigning a forwarding output port for outputting of a MAC-in-MAC frame, from among the plurality of input/output ports 122 in the network interface 120. In the present embodiment, the forwarding destination database 142 is provided through a learning function by the core controller 110 based on MAC-in-MAC frames received through the input/output ports 122, however, in an alternative embodiment, the forwarding destination database 142 may be provided at least in part based on information received through the administration interface 150.

In the description of the present embodiment, the symbol "142" is used to identify generally any forwarding destination database in a core switch, while in instances where it is necessary to individually identify the forwarding destination database in a particular core switch, a symbol including a letter suffixed to "142" will be used. For example, the symbol "142e" is used for the forwarding destination database in the core switch 100e.

FIG. 7 is an illustration showing an example of a forwarding destination database 142e in a core switch 100e. The forwarding destination database 142 in the core switch 100 includes storage fields 1421, 1422, 1424, 1426, and 1429.

The storage field 1421 of the forwarding destination database 142 is a field for storing a registration number for identifying information registered in this forwarding destination database 142. The storage field 1422 of the forwarding destination database 142 is a field for storing a VLAN identifier for identifying a VLAN configured in the user networks 61 and 62. The storage field 1424 of the forwarding destination database 142 is a field for storing a core network destination MAC address showing a destination of a MAC-in-MAC frame. The storage field 1426 of the forwarding destination database 142 is a field for storing an output port number indicating a forwarding output port by using port numbers assigned to each of the plurality of input/output ports 122. The storage field 1429 of the forwarding destination database 142 is a field for storing a learning source of information recorded in the forwarding destination database 142.

For example, in the case of the forwarding destination database 142e shown in FIG. 7, the registration information identified with registration number "1" shows that the information is learned from an input/output port 122 assigned to the port number "1". The registration information identified with the registration number "1" shows that, when a MAC-in-MAC frame received in the core switch 100e belongs to a VLAN identified by the VLAN identifier "20", and has a destination MAC address "fe:00:00:20:00:01", this MAC-in-MAC frame is sent from an input/output port 122 assigned to the port number "1".

Returning to the discussion of FIG. 6, the core controller 110 of the core switch 100 is electrically connected to the parts of the core switch 100, and executes various control processes for forwarding a MAC-in-MAC frame. The core controller 110 includes a mark identification module 111, a multicast port setup module 112, a multicast group identification module 116, and a multicast port assignment module 117.

The mark identification module 111 of the core controller 110 identifies, from among MAC-in-MAC frames which are input through the plurality of input/output ports 122, a MAC-in-MAC frame to whose header the mark information is marked. In the present embodiment, as noted earlier, the mark information in the MAC-in-MAC frame is information indicating that an IGMP join message is encapsulated in the MAC-in-MAC frame, and the mark information is marked by the edge switch 200 during encapsulation of the IGMP join message in the MAC-in-MAC frame.

The multicast port setup module 112 of the core controller 110 associates a multicast group of the IGMP join message which is encapsulated in the MAC-in-MAC frame identified by the mark identification module 111, with an input/output port 122 to which this MAC-in-MAC frame is input. In the present embodiment, the multicast port setup module 112 registers information for associating the multicast group with the input/output port 122 in the forwarding destination database 142.

The multicast group identification module 116 of the core controller 110 identifies a MAC-in-MAC frame to whose header the multicast group information is labeled, from among the MAC-in-MAC frames which are input through the plurality of input/output ports 122. In the present embodiment, as noted earlier, the multicast group information in the MAC-in-MAC frame is information for showing the multicast group to which the multicast packet encapsulated in the MAC-in-MAC frame is being distributed, and the multicast group information is labeled by the edge switch 200 during encapsulation of the multicast packet in the MAC-in-MAC frame.

The multicast port assignment module 117 of the core controller 110 assigns an input/output port 122 which is associated by the multicast port setup module 112 with a multicast group shown by the multicast group information of the MAC-in-MAC frame identified by the multicast group identification module 116, as a forwarding output port for outputting this MAC-in-MAC frame. In the present embodiment, the multicast port assignment module 117 references the forwarding destination database 142 when assigning the forwarding output port.

In the present embodiment, the functions of the mark identification module 111, the multicast port setup module 112, the multicast group identification module 116, and the multicast port assignment module 117 in the core controller 110 are accomplished by operation of ASICs based on their physical circuit design; however, in an alternative embodiment, these functions could be accomplished at least in part by operation of a CPU on the basis of a computer program.

A2. Computer Network Operation

A2-1. Edge Relay Process

Figure 8:
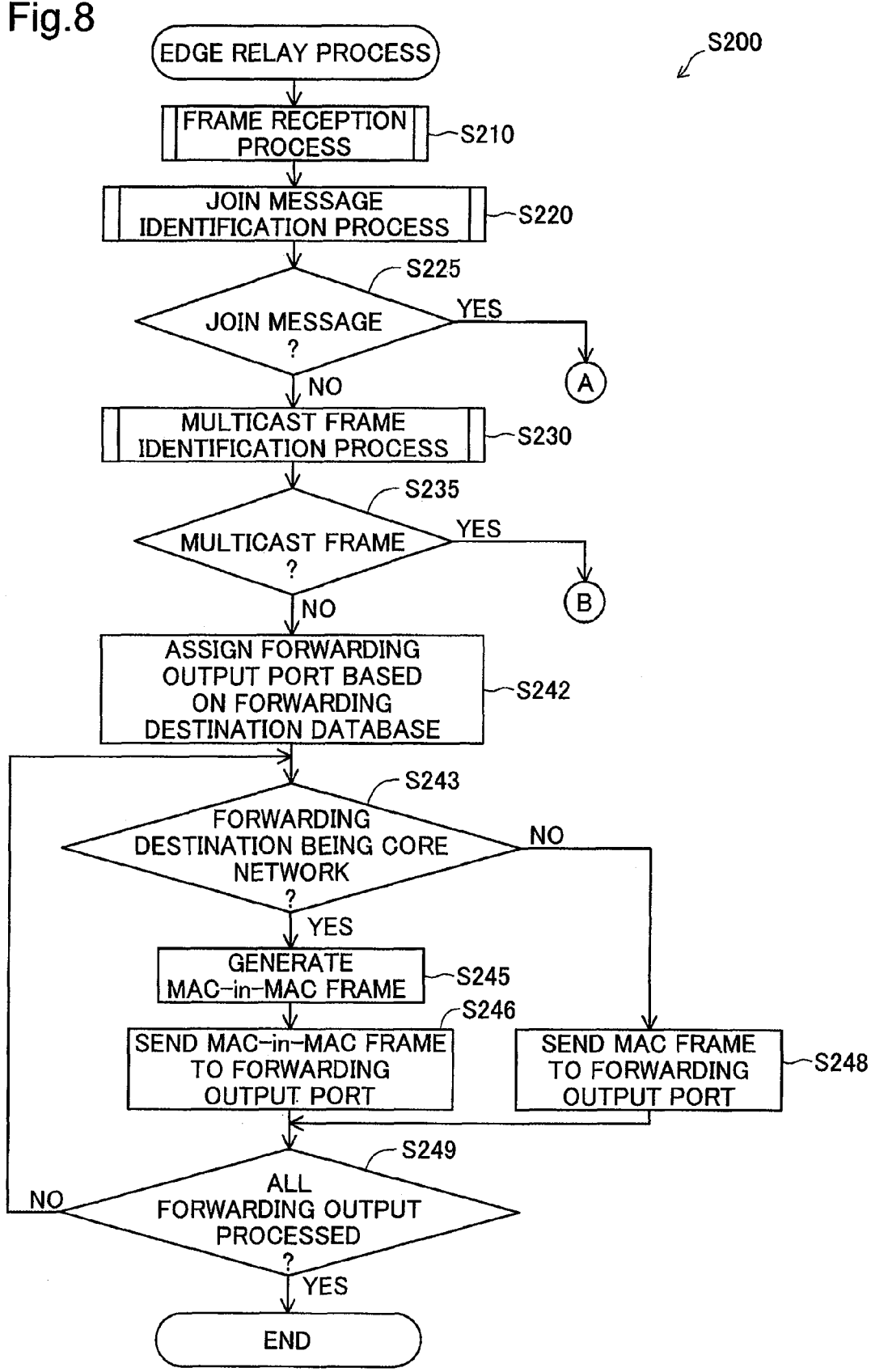
FIGS. 8, 9 and 10 are flowcharts showing an edge relay process that is executed by an edge controller of the edge switch in the carrier network.
Figure 9:
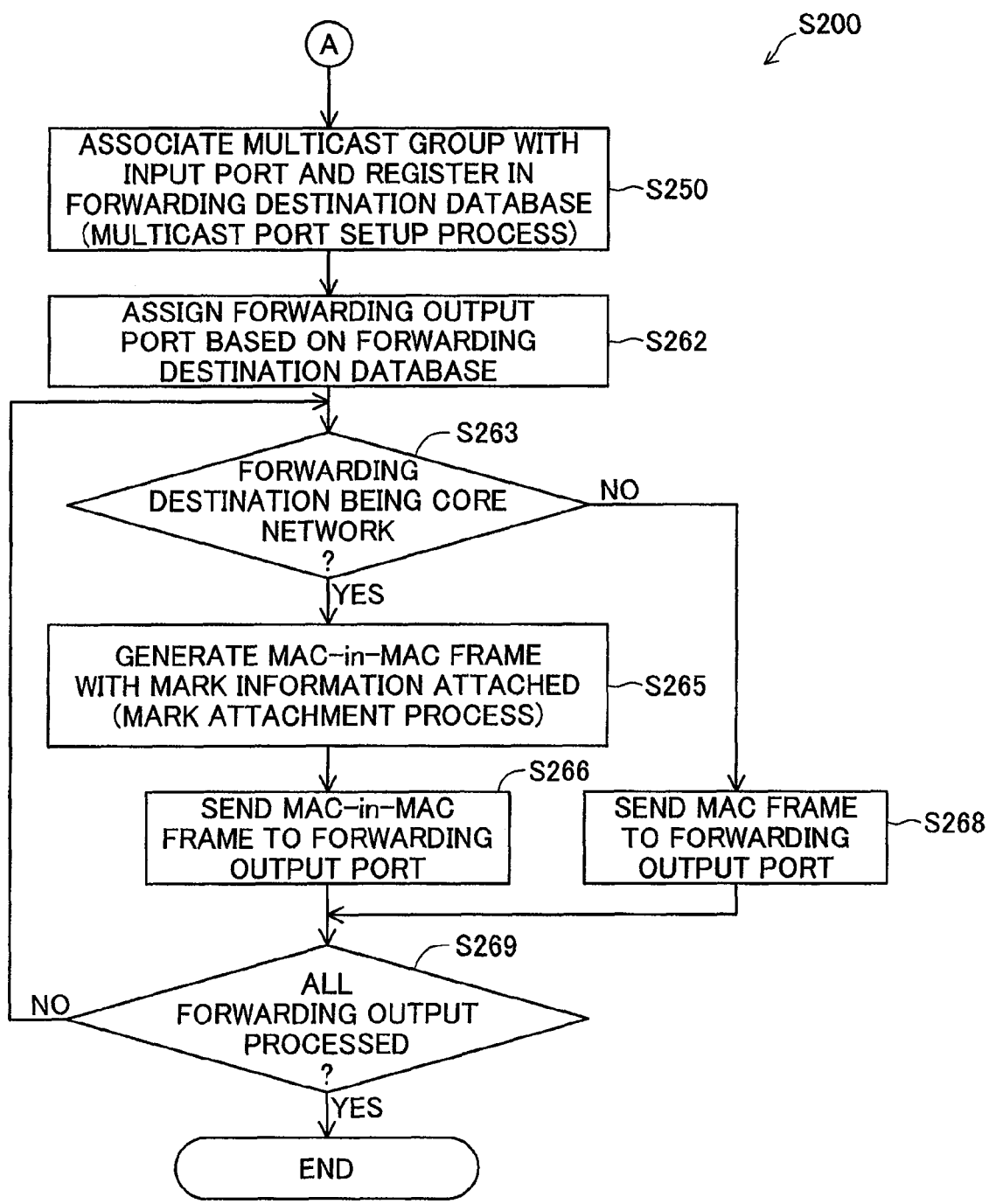
Figure 10:
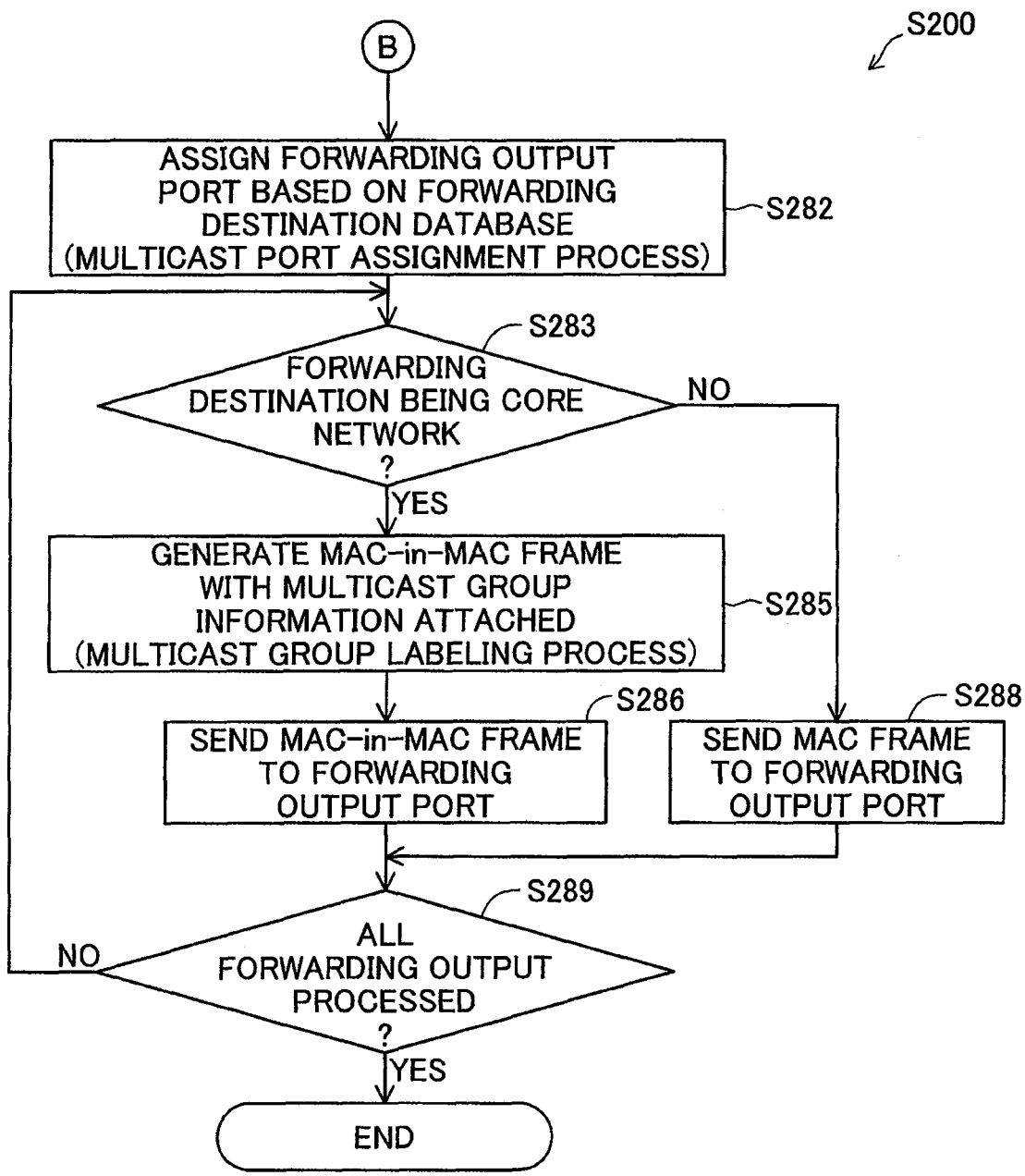

FIGS. 8 to 10 are flowcharts showing an edge relay process (Step S200) that is executed by the edge controller 210 of an edge switch 200 in the carrier network 10. The edge relay process (Step S200) is a process for relaying between the user networks 61 and 62, and the core switches 100 with converting between a MAC frame and a MAC-in-MAC frame. In the present embodiment, the edge controller 210 initiates the edge relay process (Step S200) when a layer 2 frame, including a MAC frame or a MAC-in-MAC frame, is input to the input/output port 222.

As shown in FIG. 8, when the edge relay process (Step S200) is initiated, the edge controller 210 executes a frame reception process (Step S210). In the frame reception process (Step S210), when a layer 2 frame which is input to the input/output port 222 is a MAC frame, the edge controller 210 accepts without modification the MAC frame received from the input/output port 222. In the frame reception process (Step S210), on the other hand, when a Layer 2 frame which is input to the input/output port 222 is a MAC-in-MAC frame, the edge controller 210 decapsulates to a MAC frame from this MAC-in-MAC frame received from the input/output port 222, and then accepts the decapsulated MAC frame. Herein, MAC-in-MAC frame decapsulation means converting a MAC-in-MAC frame to obtain a MAC frame which is encapsulated in the storage field 850 of the frame structure 800 of this MAC-in-MAC frame.

Subsequent to the frame reception process (Step S210), the edge controller 210 executes a join message identification process (Step S220) based on the functionality provided by the join message identification module 211. In the join message identification process (Step S220), from among MAC frames received in the frame reception process (Step S210), the edge controller 210 identifies a join message addressed to the router 612 from the personal computer 610 to be joining a multicast group. In the present embodiment, during the join message identification process (Step S210), the edge controller 210, by using IGMP snooping, identifies an IGMP join message addressed as a join message to the router 612 by the personal computer 610.

Moving on to a description of FIG. 9, when the MAC frame is an IGMP join message (FIG. 8: Step S225: YES), the edge controller 210 executes a multicast port setup process (Step S250) based on the functionality provided by the multicast port setup module 212. In the multicast port setup process (Step S250), the edge controller 210 associates a multicast group of the IGMP join message identified in the join message identification process (Step S220) with an input/output port 222 to which this IGMP join message is input. In the present embodiment, the edge controller 210 registers information for associating the multicast group with the input/output port 222 in the forwarding destination database 242.

The description now turns to the operation of the multicast port setup process (Step S250) that is executed in the edge switches 200a and 200c when an IGMP join message is sent from the personal computer 610c belonging to the point network 61c, to the router 612a belonging to the point network 61a. In this description, a multicast MAC address, which indicates a multicast group in this IGMP join message, is "01:00:5e:00:12:34".

When the edge switch 200c receives an IGMP join message from the personal computer 610c through the input/output port 222 assigned to the port number "2", in the multicast port setup process (Step S250), the edge switch 200c registers the registration information identified with the registration number "500" in the forwarding destination database 242c of FIG. 5. The registration information of the registration number "500" in the forwarding destination database 242c of FIG. 5 shows that the information is learned through snooping; and shows that when a MAC frame received in the edge switch 200c belongs to a VLAN identified with the VLAN identifier "20" and has a destination MAC address "01:00:5e:00:12:34", this MAC frame should be sent from the input/output port 222 identified with the port number "2".

On the other hand, when the edge switch 200a receives an IGMP join message sent from the personal computer 610c and routed via the edge switch 200c and the core network 12, through the input/output port 222 assigned to the port number "1", in the multicast port setup process (Step S250), the edge switch 200a, registers the registration information identified with the registration number "500" in the forwarding destination database 242a of FIG. 4. The registration information of the registration number "500" in the forwarding destination database 242a of FIG. 4 shows that the information is learned through snooping; and shows that when the MAC frame received in the edge switch 200a belongs to a VLAN identified with the VLAN identifier "20" and has a destination MAC address "01:00:5e:00:12:34", a destination MAC address of a MAC-in-MAC frame in which this MAC frame is encapsulated should be set to "ff:00:00:20:12:34", and this MAC-in-MAC frame should be sent from the input/output port 222 identified with the port number "1". In the present embodiment, the core network destination MAC address "ff:00:00:20:12:34" is a MAC address generated through conversion of the multicast MAC address "01:00:5e:00:12:34" showing the multicast group in the IGMP join message.

Returning to the description of FIG. 9, subsequent to the multicast port setup process (Step S250), the edge controller 210 selects and assigns a forwarding output port for outputting the IGMP join message, from among the plurality of input/output ports 222 based on the forwarding destination database 242 (Step S262).

After assigning the forwarding output port (Step S262), when the forwarding destination connected to the forwarding output port is the core network 12 (Step S263: YES), the edge controller 210 executes a mark attachment process (Step S265) based on the functionality provided by the marking module 213. In the mark attachment process (Step S265), the edge controller 210 marks mark information indicating that an IGMP join message is encapsulated to a header of a MAC-in-MAC frame in which the IGMP join message identified in the join message identification process (Step S210) is encapsulated.

In the present embodiment, the mark information is 1-bit data for which a value of "1" indicates that an IGMP join message is encapsulated in the MAC-in-MAC frame. In the present embodiment, the mark information is stored in the storage field 836 of the frame structure 800 of the MAC-in-MAC frame, however, in an alternative embodiment, the mark information may instead be stored in at least one of the storage fields 810, 820, and 840. When the mark information is stored in at least one of the storage fields 810 and 820 for storing a MAC address, the core switch 100 and/or edge switch 200 may be provided with functionality to distinguish between and recognize a MAC address and mark information. It is possible thereby to avoid increasing the amount of data kept in the forwarding destination database due to marking of the mark information.

Subsequent to the mark attachment process (Step S265), the edge controller 210 sends the MAC-in-MAC frame to whose the header the mark information is marked, to the input/output port 222 assigned as the forwarding output port (Step S266).

After assigning the forwarding output port (Step S262), when the forwarding destination connected to the forwarding output port is not the core network 12 (Step S263: NO), the edge controller 210 sends the MAC frame transporting the IGMP join message without modification to the input/output port 222 assigned as the forwarding output port (Step S268).

Once processing for all of the forwarding output ports is completed (Step S269: YES), the edge controller 210 terminates the edge relay process (Step S200).

Returning to the description of FIG. 8, when the MAC frame received in the frame reception process (Step S210) is not an IGMP join message (Step S225: NO), the edge controller 210 executes a multicast frame identification process (Step S230) based on the functionality provided by the multicast frame identification module 216. In the multicast frame identification process (Step S230), the edge controller 210 identifies a multicast frame from among MAC frames received in the frame reception process (Step S210). In the present embodiment, in the multicast frame identification process (Step S230), when a destination MAC address in the MAC frame is a multicast MAC address, the edge controller 210 recognizes the MAC frame as being a multicast frame.

Moving on to a description of FIG. 10, when the MAC frame is a multicast frame (FIG. 8: Step S235: YES), the edge controller 210 executes a multicast port assignment process (Step S282) based on the functionality provided by the multicast port assignment module 217. In the multicast port assignment process (Step S282), the edge controller 210 selects and assigns a forwarding output port for outputting the multicast frame, from among the plurality of input/output ports 222 based on the forwarding destination database 242.

The description now turns to the operation of the multicast port assignment process (Step S282) that is executed in the edge switches 200a and 200c when a multicast packet distributed by the server computer 900 connected to the Internet 90 is forwarded by the router 612a configured for multicast communications with the multicast group "01:00:5e:00:12:34".

When the edge switch 200a receives a multicast frame carrying a multicast packet from the router 612a through the input/output port 222 identified with the port number "2", in the multicast port assignment process (Step S282), the edge switch 200a searches the registration information of the forwarding destination database 242a shown in FIG. 4 to retrieve registration information that matches a VLAN identifier and a destination MAC address (multicast group) identified with this multicast frame. In the example shown in FIG. 4, the corresponding registration information is that of the registration number "500", and this registration information shows that a destination MAC address of a MAC-in-MAC frame in which this multicast frame is to be encapsulated should be set to "ff:00:00:20:12:34", and that an input/output port 222 identified with the port number should be assigned as the forwarding output port.

On the other hand, when the edge switch 200c receives a multicast frame routed from the edge switch 200a through the core network 12 through the input/output port 222 assigned to the port number "1", in the multicast port assignment process (Step S282), the edge switch 200c searches the registration information of the forwarding destination database 242c shown in FIG. 5 to retrieve registration information that matches a VLAN identifier and a destination MAC address (multicast group) identified with this multicast frame. In the example shown in FIG. 5, the corresponding registration information is that of the registration number "500", and this registration information shows that an input/output port 222 identified with the port number "2" should be assigned as the forwarding output port.

Returning to the description of FIG. 10, after the forwarding output port is assigned in the multicast port assignment process (Step S282), when the forwarding destination connected to the forwarding output port is the core network 12 (Step S283: YES), the edge controller 210 executes a multicast group labeling process (Step S285) based on the functionality provided by the multicast group labeling module 218. In the multicast group labeling process (Step S285), the edge controller 210 labels multicast group information showing the multicast group to a header of a MAC-in-MAC frame in which the multicast frame that is identified in the multicast frame identification process (Step S230) is encapsulated. In the present embodiment, the multicast group information is a core network destination MAC address associated with this multicast group and registered in the forwarding destination database 242, and the edge controller 210 attaches the multicast group information to the header of the MAC-in-MAC frame by setting the core network destination MAC address in the MAC-in-MAC frame on the basis of the forwarding destination database 242.

In the present embodiment, the multicast group information is the core network destination MAC address generated through conversion of the multicast MAC address showing the multicast group, and the edge controller 210 stores the multicast group information in the storage field 810 in the frame structure 800 of the MAC-in-MAC frame. However, in an alternative embodiment, the edge controller 210 may instead store multicast group information, in the form of the unmodified multicast MAC address, in the storage field 810 in the frame structure 800 of the MAC-in-MAC frame; or store the multicast group information, either in the form of unmodified multicast MAC address information or modified multicast MAC address information, in the storage field 838 in the frame structure 800 of the MAC-in-MAC frame.

Subsequent to the multicast group labeling process (Step S285), the edge controller 210 sends the MAC-in-MAC frame labeled with the multicast group information to the input/output port 222 assigned as the forwarding output port (Step S286).

After the forwarding output port is assigned in the multicast port assignment process (Step S282), when the forwarding destination connected to the forwarding output port is not the core network 12 (Step S283: NO), the edge controller 210 sends the unmodified MAC frame carrying a multicast frame to the input/output port 222 assigned as the forwarding output port (Step S288).

Once processing for all of the forwarding output ports is completed (Step S289: YES), the edge controller 210 terminates the edge relay process (Step S200).

Returning to the description of FIG. 8, when a MAC frame received in the frame reception process (Step S210) is neither an IGMP join message nor a multicast frame (Step S235: NO), the edge controller 210 sends the MAC frame received in the frame reception process (Step S210) to the appropriate input/output port 222 on the basis of the forwarding destination database 242 (Steps S242, S243, S245, S246, S248 and S249). The edge controller 210 then terminates the edge relay process (Step S200).

A2-2. Core Relay Process

Figure 11:
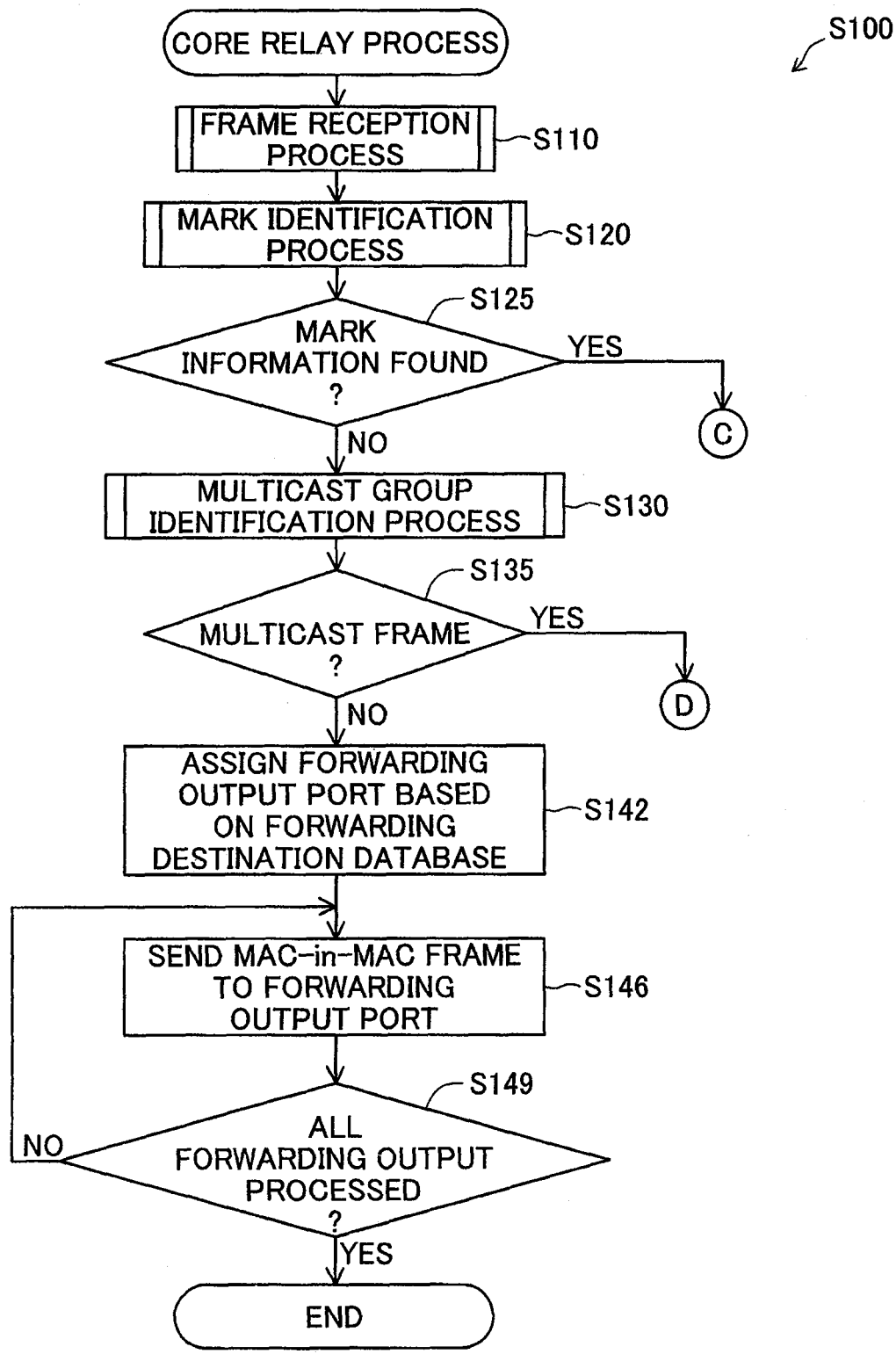
FIGS. 11, 12 and 13 are flowcharts showing a core relay process that is executed by a core controller of the core switch in the carrier network.
Figure 12:
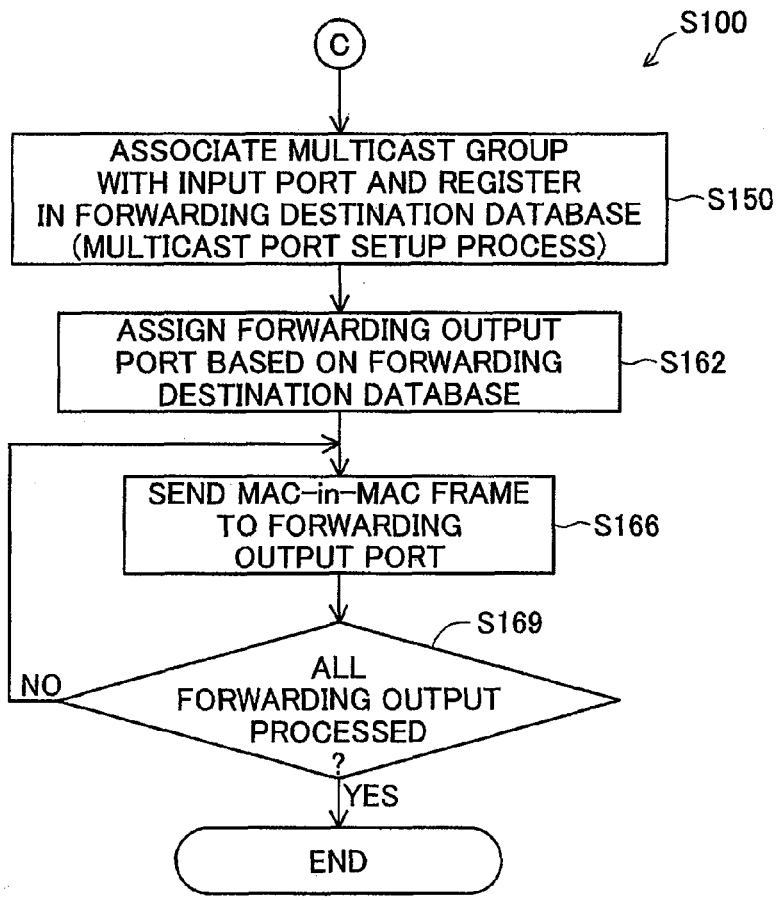
Figure 13:
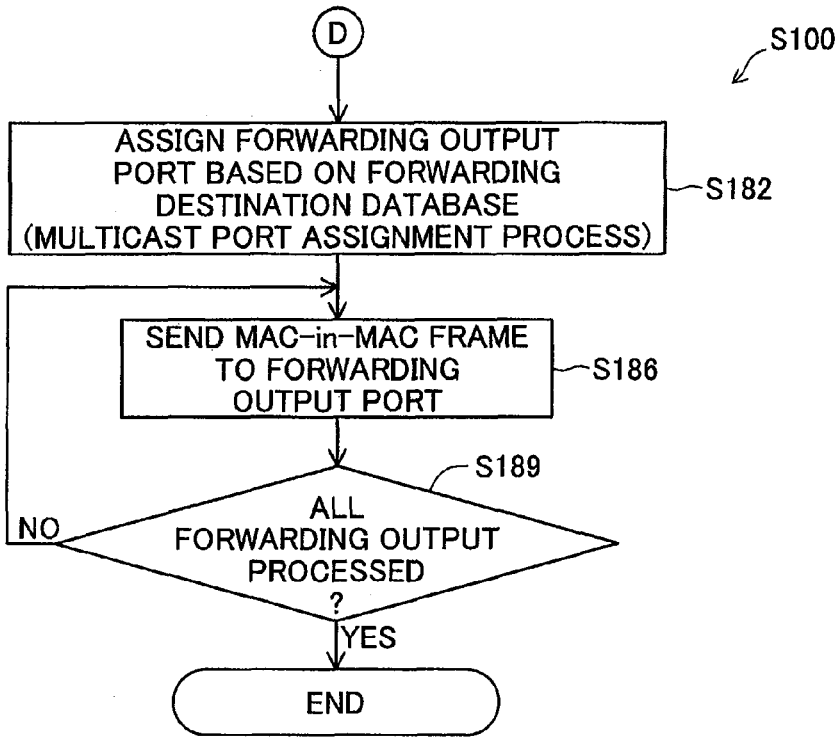

FIGS. 11 to 13 are flowcharts showing a core relay process (Step S100) that is executed by the core controller 110 of the core switch 100 in the carrier network 10. The core relay process (Step S100) is a process for relaying a MAC-in-MAC frame in which a MAC frame is encapsulated. In the present embodiment, the core controller 110 initiates the core relay process (Step S100) when a MAC-in-MAC frame, which is a layer 2 frame, is input to the input/output port 122.

As shown in FIG. 11, when the core relay process (Step S100) is initiated, the core controller 110 executes a frame reception process (Step S110). In the frame reception process (Step S110), the core controller 110 receives a MAC-in-MAC frame accepted from the input/output port 122.

Subsequent to the frame reception process (Step S110), the core controller 110 executes a mark identification process (Step S120) based on the functionality provided by the mark identification module 111. In the mark identification process (Step S120), the core controller 110 identifies a MAC-in-MAC frame to whose header the mark information is marked, from among the MAC-in-MAC frames received in the frame reception process (Step S110).

In the present embodiment, as noted earlier, the mark information in a MAC-in-MAC frame indicates that an IGMP join message is encapsulated in this MAC-in-MAC frame, and the mark information is marked by the edge switch 200 during encapsulation of the IGMP join message in the MAC-in-MAC frame. In the present embodiment, the mark information is 1-bit data for which a value of "1" indicates that an IGMP join message is encapsulated in the MAC-in-MAC frame, and is stored in the storage field 836 of the frame structure 800 of the MAC-in-MAC frame.

Moving on to a description of FIG. 12, when mark information indicating a value of "1" is found to be attached to the MAC-in-MAC frame received in the frame reception process (Step S110) (FIG. 11: Step S125: YES), the core controller 110 executes a multicast port setup process (Step S150) based on the functionality provided by the multicast port setup module 112. In the multicast port setup process (Step S150), the core controller 110 associates a multicast group of the IGMP join message which is encapsulated in the MAC-in-MAC frame marked with the mark information with an input/output port 122 to which this MAC-in-MAC frame is input. In the present embodiment, the core controller 110 registers this information associating the multicast group with the input/output port 122 in the forwarding destination database 142.

The description now turns to the operation of the multicast port setup process (Step S150) that is executed in the core switch 100e when an IGMP join messages is sent from both the personal computer 610b belonging to the point network 61b and the personal computer 610c belonging to the point network 61c, to the router 612a belonging to the point network 61a. In the following description, a multicast MAC address in the IGMP join message, which indicates a multicast group, is "01:00:5e:00:12:34"; and a core network destination MAC address "ff:00:00:20:12:34", which is generated by conversion of this multicast MAC address, is used as the multicast MAC address in the core network 12.

When the core switch 100e receives a MAC-in-MAC frame, in which a IGMP join message from the personal computer 610b is encapsulated, through the input/output port 122 identified with the port number "2", and receives a MAC-in-MAC frame, in which a IGMP join message from the personal computer 610c is encapsulated, through the input/output port 122 identified with the port number "3", in the multicast port setup process (Step S150), the core switch 100e registers the registration information identified with the registration number "500" in the forwarding destination database 142e of FIG. 7. The registration information of the registration number "500" in the forwarding destination database 142e of FIG. 7 shows that the information is learned through snooping, and that when a MAC-in-MAC frame received in the core switch 100e belongs to a VLAN identified with the VLAN identifier "20" and has a destination MAC address "ff:00:00:20:12:34", this MAC-in-MAC frame should be sent from the input/output port 122 identified with the port number "2" and the input/output port 122 identified with the port number "3".

Returning to the description of FIG. 12, subsequent to the multicast port setup process (Step S150), the core controller 110 sends the MAC-in-MAC frame in which the IGMP join message is encapsulated, to the appropriate input/output port 122 on the basis of the forwarding destination database 142 (Steps S162, S166, S169). The core controller 110 then terminates the core relay process (Step S100).

Returning to the description of FIG. 11, when a MAC-in-MAC frame received in the frame reception process (Step S110) is not attached with the mark information indicating a value of "1" (Step S125: NO), the core controller 110 executes a multicast group identification process (Step S130) based on the functionality provided by the multicast group identification module 116. In the multicast group identification process (Step S130), the core controller 110 identifies a MAC-in-MAC frame labeled with multicast group information, from among the MAC-in-MAC frames received in the frame reception process (Step S110).

In the present embodiment, as noted previously, the multicast group information in a MAC-in-MAC frame is information that shows a multicast group for distribution of the multicast packet encapsulated in this MAC-in-MAC frame, and the multicast information is labeled by the edge switch 200 during encapsulation of the multicast packet in this MAC-in-MAC frame. In the present embodiment, the multicast group information is a core network destination MAC address generated by converting a multicast MAC address showing a multicast group, and is stored in the storage field 810 of the frame structure 800 of the MAC-in-MAC frame.

Moving on to a description of FIG. 13, when a MAC-in-MAC frame received in the frame reception process (Step S110) is found to be attached with multicast group information (FIG. 11: Step S135: YES), the core controller 110 executes a multicast port assignment process (Step S182) based on the functionality provided by the multicast port assignment module 117. In the multicast port assignment process (Step S182), the core controller 110 selects and assigns a forwarding output port for outputting the MAC-in-MAC frame labeled with the multicast group information, from among the plurality of input/output ports 122 based on the forwarding destination database 142.

The description now turns to the operation of the multicast port assignment process (Step S182) that is executed in the core switch 100e when a multicast packet distributed by the server computer 900 connected to the Internet 90 is being forwarded by the router 612a configured for multicast communications with the multicast group "01:00:5e:00:12:34".

When the core switch 100e receives a MAC-in-MAC frame carrying a multicast packet from the router 612a through the input/output port 122 identified with the port number "1", in the multicast port assignment process (Step S182), the core switch 100e searches the registration information of the forwarding destination database 142e shown in FIG. 7 and retrieves registration information that matches a VLAN identifier and a destination MAC address (multicast group) shown by this MAC-in-MAC frame. In the example shown in FIG. 7, the corresponding registration information is that of the registration number "500", and this registration information shows that the input/output ports 122 identified with the port number "2" and the port number "3" should be assigned as the forwarding output ports.

Returning to the description of FIG. 13, subsequent to the multicast port assignment process (Step S182), the core controller 110 sends the MAC-in-MAC frame received in the frame reception process (Step S110) to the input/output ports 122 that in the multicast port assignment process (Step S182) are assigned as the forwarding output ports (Steps S186, S189). The core controller 110 then terminates the core relay process (Step S100).

Figure 14:
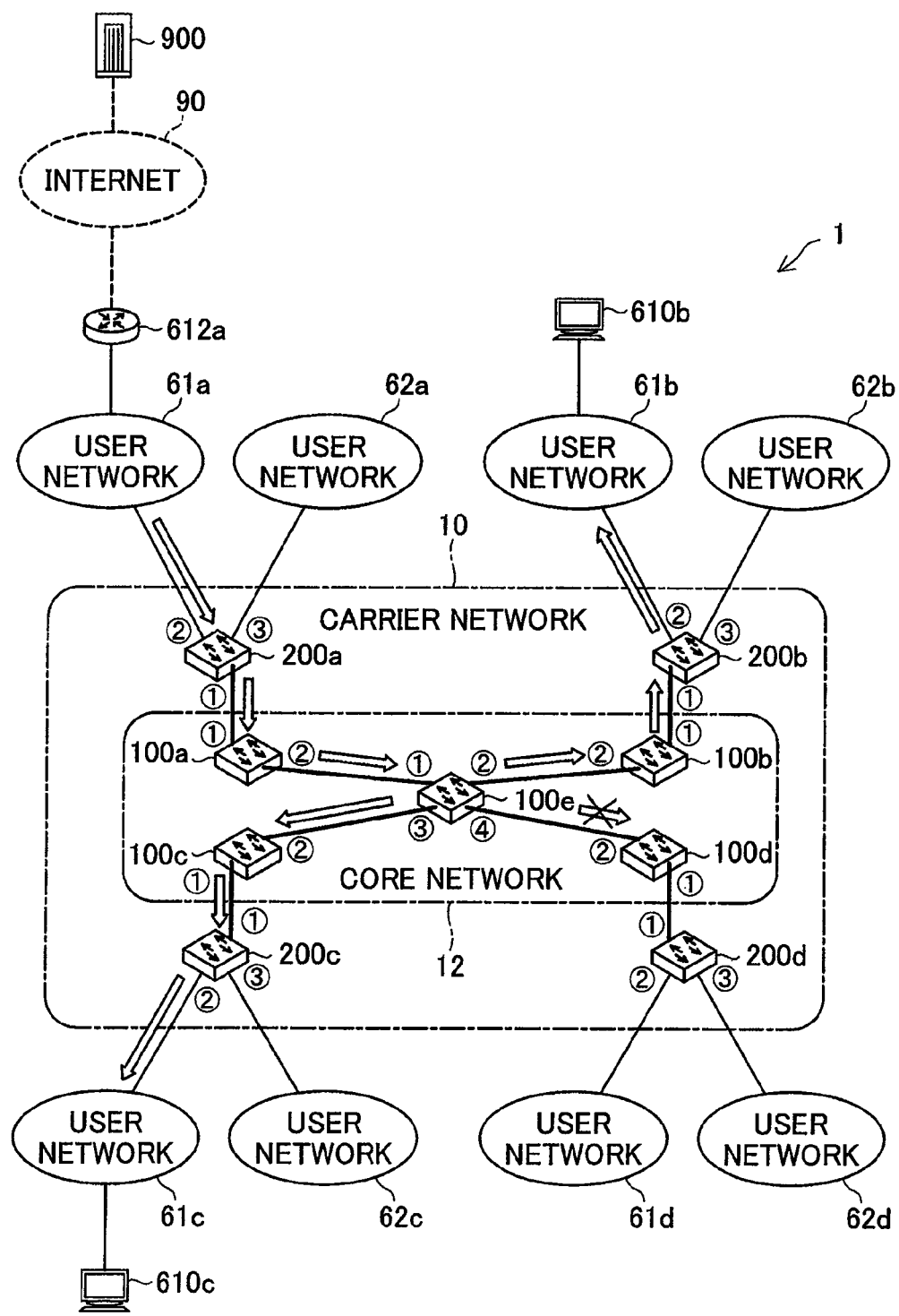
FIG. 14 is an illustration showing an example of forwarding of multicast packets in the carrier network.

FIG. 14 is an illustration showing an example of forwarding of multicast packets in the carrier network 10. In the present embodiment, as mentioned previously, when the core switch 100e receives a MAC-in-MAC frame which is carrying a multicast packet from the router 612a, through the input/output port 122 identified with the port number "1", the core switch 100e sends the MAC-in-MAC frame to the input/output ports 122 identified with the port number "2" and the port number "3" (Step S186). As shown in FIG. 14, as a result, even if a MAC-in-MAC frame in which a multicast frame is encapsulated is forwarded to the carrier network 10, flooding of the core switch 100d from the core switch 100e is avoided.

Returning to the description of FIG. 11, when the MAC-in-MAC frame received in the frame reception process (Step S110) is not attached with mark information and multicast group information (Step S135: NO), the core controller 110 sends the MAC-in-MAC frame received in the frame reception process (Step S110) to the input/output port 122 based on the forwarding destination database 142 (Steps S142, S146). The core controller 110 then terminates the core relay process (Step S100).

A3. Effects

According to the carrier network 10 described hereinabove, through snooping of the mark information marked to the header of the MAC-in-MAC frame in the core switch 100 (Step S120), the input/output port 122 of the core switch 100 can be associated with a multicast group (Step S150). By so doing, the multicast group can be identified from the MAC-in-MAC frame in which a multicast frame is encapsulated (Step S130), and the MAC-in-MAC frame can be output from the input/output port 122 associated with the multicast group in question. As a result, it can avoid flooding with MAC-in-MAC frames in which multicast frames are encapsulated, thereby limiting any reduction of communication rate caused by multicast communications.

B. Alternative Embodiments

Although an embodiment of the invention has been described, the invention should not be construed as limited to the embodiment set forth hereinabove, and naturally various embodiments may be enabled without departing from the scope of the invention.

What is claimed is:

1. A network system that forms an L2VPN for relaying a MAC frame being forwarded among a plurality of points in a user network, comprising:
    a core switch that relays a MAC-in-MAC frame in which the MAC frame is encapsulated; and
    an edge switch that relays the MAC frame between the user network and the core switch with conversion between the MAC frame and the MAC-in-MAC frame,
    wherein the edge switch includes:
        a join message identification unit that identifies, from among MAC frames from the user network before encapsulating the MAC frame into the MAC-in-MAC frame, a join message being forwarded to a router from a host to join a multicast group; and
        a marking unit that marks a header of a MAC-in-MAC frame in which the identified join message is encapsulated, with mark information indicating the identified join message,
    wherein the core switch includes:
        a plurality of input/output ports that performs input and output of a layer 2 frame;
        a mark identification unit that identifies, from among MAC-in-MAC frames which are input through the plurality of input/output ports, a MAC-in-MAC frame in which a header is marked with the mark information; and
        a port setup unit that associates a multicast group of a join message which is encapsulated in the identified MAC-in-MAC frame, with an input/output port to which the identified MAC-in-MAC frame is input.

2. The network system according to claim 1,
    wherein the edge switch further includes:
        a multicast frame identification unit that identifies, from among MAC frames from the user network, a multicast frame being forwarded from the router; and
        a multicast group labeling unit that labels a header of a MAC-in-MAC frame in which the identified multicast frame is encapsulated, with multicast group information showing a multicast group of the identified multicast frame,
    wherein the core switch further includes:
        a multicast group identification unit that identifies, from among MAC-in-MAC frames which are input through the plurality of input/output ports, a MAC-in-MAC frame in which a header the multicast group information is labeled; and
        a port assignment unit that assigns, as a forwarding output port for outputting the MAC-in-MAC frame identified by the multicast group identification unit, an input/output port which is associated by the port setup unit with a multicast group shown by the multicast group information of the MAC-in-MAC frame identified by the multicast group identification unit.

3. The network system according to claim 1,
    wherein the marking unit of the edge switch marks with the mark information to at least one of following storage fields in the header of the MAC-in-MAC frame in which the identified join message is encapsulated:
    (a1) a storage field for storing information showing priority of processing the MAC-in-MAC frame;
    (a2) a storage field for storing information showing a sender of the MAC-in-MAC frame;
    (a3) a storage field for storing information showing a destination of the MAC-in-MAC frame; and
    (a4) a storage field for storing information showing a protocol and/or size regarding data being transported by the MAC-in-MAC frame.

4. The network system according to claim 2,
    wherein the multicast group labeling unit of the edge switch labels with the multicast group information to at least one of following storage fields in the header of the MAC-in-MAC frame in which the identified multicast frame is encapsulated:
    (b1) a storage field for storing information showing a destination of the MAC-in-MAC frame; and (b2) a storage field for storing information showing a user network for which a MAC frame is encapsulated in the MAC-in-MAC frame.

5. A core switch that relays a MAC-in-MAC frame in which a MAC frame is encapsulated, comprising:
   a plurality of input/output ports that performs input and output of a layer 2 frame;
   a mark identification unit that identifies, from among MAC-in-MAC frames which are input through the plurality of input/output ports, a MAC-in-MAC frame in which a header is marked with a mark information, wherein the mark information indicates a join message being forwarded to a router from a host to join a multicast group and which was identified before the MAC frame was encapsulated into the MAC-in-MAC frame; and
   a port setup unit that associates a multicast group of a join message which is encapsulated in the identified MAC-in-MAC frame, with an input/output port to which the identified MAC-in-MAC frame is input.

6. The core switch according to claim 5, further comprising:
   a multicast group identification unit that identifies, from among MAC-in-MAC frames which are input through the plurality of input/output ports, a MAC-in-MAC frame to whose a multicast group information is labeled, wherein the multicast group information shows a multicast group of a multicast frame being forwarded from the router; and
   a port assignment unit that assigns, as a forwarding output port for outputting the MAC-in-MAC frame identified by the multicast group identification unit, an input/output port which is associated by the port setup unit with a multicast group shown by the multicast group information of the MAC-in-MAC frame identified by the multicast group identification unit.

7. An edge switch that relays a MAC frame between a user network and a core switch with conversion between the MAC frame and a MAC-in-MAC frame, comprising:
   a join message identification unit that identifies, from among MAC frames from the user network before encapsulating the MAC frame into the MAC-in-MAC frame, a join message being forwarded to a router from a host to join a multicast group; and
   a marking unit that marks a header of a MAC-in-MAC frame in which the identified join message is encapsulated, with mark information indicating the identified join message.

8. The edge switch according to claim 7, further comprising:
   a multicast frame identification unit that identifies, from among MAC frames from the user network, a multicast frame being forwarded from the router; and
   a multicast group labeling unit that labels a header of a MAC-in-MAC frame in which the identified multicast frame is encapsulated, with multicast group information showing a multicast group of the identified multicast frame.

9. A method for relaying a MAC frame being forwarded among a plurality of points in a user network, comprising:
   relaying, by a core switch, a MAC-in-MAC frame in which the MAC frame is encapsulated, wherein the core switch includes a plurality of input/output ports that performs input and output of a layer 2 frame; and
   relaying, by a edge switch, the MAC frame between the user network and the core switch with conversion between the MAC frame and the MAC-in-MAC frame,
   wherein the relaying by the edge switch includes:
      identifying, from among MAC frames from the user network before encapsulating the MAC frame into the MAC-in-MAC frame, a join message being forwarded to a router from a host to join a multicast group; and
      marking a header of a MAC-in-MAC frame in which the identified join message is encapsulated, with mark information indicating the identified join message,
   wherein the relaying by the core switch includes:
      identifying, from among MAC-in-MAC frames which are input through the plurality of input/output ports, a MAC-in-MAC frame in which a header is marked with the mark information; and
      associating a multicast group of a join message which is encapsulated in the identified MAC-in-MAC frame, with an input/output port to which the identified MAC-in-MAC frame is input.

10. The method according to claim 9,
   wherein the relaying by the edge switch further includes:
      identifying, from among MAC frames from the user network, a multicast frame being forwarded from the router; and
      labeling a header of a MAC-in-MAC frame in which the identified multicast frame is encapsulated, with multicast group information showing a multicast group of the identified multicast frame,
   wherein the relaying by the core switch further includes:
      identifying, from among MAC-in-MAC frames which are input through the plurality of input/output ports, a MAC-in-MAC frame in which a header the multicast group information is labeled; and
      assigning, as a forwarding output port for outputting the MAC-in-MAC frame identified by the multicast group information, an input/output port which is associated by the port setup unit with a multicast group shown by the multicast group information of the MAC-in-MAC frame identified by the multicast group information.

* * * * *